US010380983B2

(12) United States Patent
Roblek

(10) Patent No.: US 10,380,983 B2
(45) Date of Patent: Aug. 13, 2019

(54) MACHINE LEARNING TO GENERATE MUSIC FROM TEXT

(71) Applicant: Google Inc., Mountain View, CA (US)

(72) Inventor: Dominik Roblek, Meilen (CH)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/394,895

(22) Filed: Dec. 30, 2016

(65) Prior Publication Data

US 2018/0190249 A1 Jul. 5, 2018

(51) Int. Cl.
*A63H 5/00* (2006.01)
*G10H 1/00* (2006.01)
*G06F 17/24* (2006.01)
*G06F 17/27* (2006.01)
*G06N 20/00* (2019.01)
*G10L 25/30* (2013.01)

(52) U.S. Cl.
CPC ......... *G10H 1/0025* (2013.01); *G06F 17/241* (2013.01); *G06F 17/2785* (2013.01); *G06N 20/00* (2019.01); *G10H 2210/111* (2013.01); *G10H 2240/085* (2013.01); *G10H 2250/311* (2013.01); *G10L 25/30* (2013.01)

(58) Field of Classification Search
CPC .......... G10H 1/0025; G10H 2210/111; G10H 2250/311; G06F 17/241; G06F 17/2785; G06N 99/005; G10L 25/30
USPC ......................................................... 84/609
See application file for complete search history.

(56) References Cited

U.S. PATENT DOCUMENTS

| | | | |
|---|---|---|---|
| 6,538,187 B2 | 3/2003 | Beigi | |
| 7,169,996 B2 | 1/2007 | Georges et al. | |
| 7,714,222 B2 | 5/2010 | Taub et al. | |
| 9,721,551 B2 | 8/2017 | Silverstein | |
| 2005/0227674 A1 | 10/2005 | Kopra et al. | |
| 2017/0092258 A1* | 3/2017 | Edrenkin | G10L 13/08 |

(Continued)

OTHER PUBLICATIONS

Alm et al., "Emotions from Text: Machine Learning for Text-Based Emotion Prediction", Conference on Human Language Technology and Empirical Methods in Natural Language Processing, Vancouver, British Columbia, Canada, Oct. 6-8, 2005, pp. 579-586.

(Continued)

*Primary Examiner* — Jianchun Qin
(74) *Attorney, Agent, or Firm* — Dority & Manning, P.A.

(57) ABSTRACT

The present disclosure provides systems and methods that leverage one or more machine-learned models to generate music from text. In particular, a computing system can include a music generation model that is operable to extract one or more structural features from an input text. The one or more structural features can be indicative of a structure associated with the input text. The music generation model can generate a musical composition from the input text based at least in part on the one or more structural features. For example, the music generation model can generate a musical composition that exhibits a musical structure that mimics or otherwise corresponds to the structure associated with the input text. For example, the music generation model can include a machine-learned audio generation model. In such fashion, the systems and methods of the present disclosure can generate music that exhibits a globally consistent theme and/or structure.

17 Claims, 9 Drawing Sheets

(56) References Cited

U.S. PATENT DOCUMENTS

2017/0263228 A1 9/2017 Silverstein
2017/0323577 A1* 11/2017 Elchik .................. G09B 7/06

OTHER PUBLICATIONS

Papadopoulos et al., "AI Methods for Algorithmic Composition: A Survey, a Critical View and Future Prospects", AISB Symposium on Musical Creativity, 1999, pp. 110-117.
Quora, "What are Some Commonly Used Features that can be Extracted from Music for Machine Learning Purposes", https://www.quora.com/What-are-some-commonly-used-features-that-can-be-extracted-from-music-for-machine-learning-purposes, retrieved on Dec. 21, 2016, 3 pages.
Reddy et al., "Unsupervised Discovery of Rhyme Schemes", 49th Annual Meeting of the Association for Computational Linguistics: Human Language Technologies: short papers, vol. 2, Portland, Oregon, Jun. 19-24, 2011, pp. 77-82.
Bickerman et al., "Learning to Create Jazz Melodies Using Deep Belief Nets", Proceedings of the International Conference on Computational Creativity, Lisbon, Portugal, Jan. 7-9, 2010, pp. 228-237.
DeepLearning, "Modeling and Generating Sequences of Polyphonic Music with the RNN-RBM", http://deeplearning.net/tutorial/rnnrbm.html, retrieved on Nov. 20, 2017, 7 pages.
Eck, "Composing Music with LSTM—Blues Improvisation", http://www.iro.umontreal.ca/~eckdoug/blues/index.html, retrieved on Nov. 20, 2017, 2 pages.
Eck et al., "Finding Temporal Structure in Music: Blues Improvisation with LSTM Recurrent Networks", Proceedings of the 2002 Insitute of Electrical and Electronics Engineers Neural Networks for Signal Processing, New York, New York, Sep. 6, 2002, 11 pages.
GitHub, Inc, "Tensorflow/ Magenta", https://github.com/tensorflow/magenta/tree/master/magenta/models, retrieved on Nov. 20, 2017, 2 pages.
International Business Machines, "AlchemyLanguage", https://www.ibm.com/watson/developercloud/alchemy-language.html , retrieved on Nov. 20, 2017,5 pages.
International Business Machines, "IBM Watson Music", https://www.ibm.com/watson/music/, retrieved on Nov. 20, 2017, 6 pages.
Johnson, "Composing Music with Recurrent Neural Networks", Aug. 2, 2015, www.hexahedria.com/2015/08/03/composing-music-with-recurrent-neural-networks/, retrieved on Nov. 20, 2017, 10 pages.
Karpathy, "The Unreasonable Effectiveness of Recurrent Neural Networks", May 21, 2015, http://karpathy.github.io/2015/05/21/rnn-effectiveness/, retrieved on Nov. 20, 2017, 28 pages.
Kim, "Using Keras & Theano for Deep Learning Driven Jazz Generation", https://deepjazz.io/, retrieved on Nov. 20, 2017, 2 pages.
McDonald, "Neural Nets for Generating Music", Aug. 25, 2017, https://medium.com/artists-and-machine-intelligence/neural-nets-for-generating-music-f46dffac21c0, retrieved on Nov. 20, 2017, 18 pages.
Mehri et al., "SampleRNN: An Unconditional End-To-End Neural Audio Generation Model", arXiv:1612.07837v2, Feb. 11, 2017, 11 pages.
Nay, "Training Watson to Be Your Musical Muse", Jun. 7, 2016, https://www.ibm.com/blogs/think/2016/06/training-watson-to-be-your-musical-muse/, retrieved on Nov. 20, 2017, 12 pages.
Simon, "Performance RNN: Generating Music with Expressive Timing and Dynamics", https://magenta.tensorflow.org/performance-rnn, retrieved on Nov. 20, 2017, 6 pages.
Sony CSL, "Flow Machines", http://www.flow-machines.com/, retrieved on Nov. 20, 2017, 5 pages.
Todd, "A Connectionist Approach to Algorithmic Composition", Computer Music Journal, vol. 13, No. 4, The Massachusetts Institute of Technology, Cambridge, Massachusetts, pp. 27-43.
Walder, "Algorithmic Composition: Beyond the Piano Roll", Jun. 2016, http://users.cecs.anu.edu.au/~christian.walder/, retrieved on Nov. 20, 2017, 2 pages.
Wang et al., "Tacotron: Towards End-To-End Speech Synthesis", arXiv:1703.10135v2, Apr. 6, 2017, 10 pages.
Whitman, "A Singular Christmas (2004)", https://notes.variogr.am/2009/11/30/a-singular-christmas-2004/ retrieved on Nov. 20, 2017, 7 pages.
Creedon, "Breaking the Wall Between Technology and People", France 24, Sep. 23, 2016, https://www.france24.com/en/20160924-tech-24-paris-motor-show-artificial-intelligence-holograms-hololens-microsoft, retrieved on Aug. 30, 2018, 3 pages.
Davis et al., "Generating Music from Literature", arXiv:1403.2124, Mar. 10, 2014, 10 pages.
Davis, "How I Create Music from Literature", YouTube video, https://www.youtube.com/watch?v=bYQ4AyDgTKO, retrieved on Aug. 29, 2018, 5 pages.
Davis, "Text to Music Generator", Vimeo video, https://vimeo.com/166931672, retrieved on Aug. 29, 2018, 2 pages.
Davis, "Thesis Presentation—Transpose", Vimeo video, https://vimeo.com/67235284, retrieved on Aug. 29, 2018, 2 pages.
Diep, "Robot Reads Novels, Writes Songs About Them", Popular Science, May 14, 2014, https://www.popsci.com/article/technology/robot-reads-novels-writes-songs-about-them, retrieved on Aug. 27, 2018, 3 pages.
Foote, "Automatic Audio Segmentation Using a Measure of Audio Novelty", International Conference on Multimedia and Expo: Latest Advances in the Fast Changing World of Multimedia, New York, New York, Jul. 30-Aug. 2, 2000, pp. 452-455.
Foote et al., "Creating Music Videos Using Automatic Media Analysis", International Conference on Multimedia, Juan-les-Pins, France, Dec. 1-6, 2002, pp. 553-560.
Franklin-Wallis, "TransProse: A Novel Approach to Composing", Wired, Sep. 1, 2014, https://www.wired.co.uk/article/readers-note, retrieved on Aug. 27, 2018, 4 pages.
Gallot, "The Melody of Words", LeMonde, May 23, 2014, https://www.lemonde.fr/m-actu/article/2014/05/23/la-melodie-des-mots_4423851_4497186.html, retrieved on Aug. 27, 2018.
Hasa, "Turn Your Favorite Books into Original Music Scores", Fast Company, May 21, 2014, https://www.fastcompany.com/3030881/turn-your-favorite-books-into-original-music-scores, retrieved on Aug. 27, 2018, 11 pages.
LaPatilla, "They Create a Program that Converts Books into Music (Audio)", May 24, 2014, https://www.lapatilla.com/2014/05/24/crean-un-programa-que-convierte-los-libros-en-musica-audio/, retrieved on Aug. 27, 2018, 4 pages.
Meier, "New Algorithm Turns the Emotion of Language into Music", May 27, 2014, https://hyperallergic.com/128718/new-algorithm-turns-the-emotion-of-language-into-music/, retrieved on Aug. 27, 2018, 3 pages.
Moskvitch, 'TransProse' Software Creates Music Soundtracks from Books, Live Science, May 11, 2014, https://www.livescience.com/45500-literature-emotions-music.html, retrieved on Aug. 27, 2018, 4 pages.
NBC News, "Score! Software Writes Music Based on Book's Content", May 15, 2014, https://www.nbcnews.com/tech/innovation/score-software-writes-music-based-books-content-n106756, retrieved on Aug. 27, 2018, 12 pages.
Overly, "Donald Trump and Hillary Clinton took to the Debate Stage and Made Sweet, Sweet Music", The Washington Post, Oct. 22, 2106, https://www.washingtonpost.com/news/innovations/wp/2016/10/22/donald-trump-and-hillary-clinton-took-to-the-debate-stage-and-made-sweet-sweet-music/?noredirect=on&utm_term=.bd1d8fe4452c, retrieved on Aug. 27, 2018, 4 pages.
Overly, "This Symphony had both Human and Computer Composers", The Washington Post, Sep. 23, 2016, https://www.washingtonpost.com/news/innovations/wp/2016/09/23/this-symphony-had-both-human-and-computer-composers/?utm_term=.adea4090f6b2, retrieved on Aug. 27, 2018, 2 pages.
Price, "New Algorithm Turns 'Lord of the Flies' into an Emotional Ballad", Engadget, May 17, 2014, https://www.engadget.com/2014/05/17/transprose/, retrieved on Aug. 27, 2018, 10 pages.

(56) References Cited

OTHER PUBLICATIONS

Rossney et al., "Text to Music", Warwick Science Department of Physics, https://warwick.ac.uk/fac/sci/physics/staff/academic/bell/sonify/ttm/, retrieved on Aug. 29, 2018, 3 pages.

Rubin et al., "Generating Emotionally Relevant Musical Scores for Audio Stories", User Interface Software and Technology Symposium, Honolulu, Hawaii, Oct. 5-8, 2014, 10 pages.

Rubin et al., "Underscore: Musical Underlays for Audio Stories", User Interface Software and Technology Symposium, Cambridge, Massachusetts, Oct. 7-10, 2012, 8 pages.

Sokol, "TransPose Turns Your Favorite Novels into Original Music Scores", Vice, May 20, 2014, https://creators.vice.com/en_us/article/kbnwmz/transprose-turns-your-favorite-novels-into-musical-scores, retrieved on Aug. 27, 2018, 5 pages.

Spiegel Online, "Software Writes Music to Script", Spiegel Online, May 20, 2014, http://www.spiegel.de/netzwelt/web/transprose-analysiert-stimmung-von-text-und-macht-filmmusik-a-970453.html, retrieved on Aug. 27, 2018, 5 pages.

Starr, "TransPose Turns Literature into Music", CNet, May 19, 2014, https://www.cnet.com/news/transprose-turns-literature-into-music/, retrieved on Aug. 27, 2018, 3 pages.

Steinmetz, "This is What Classic Novels Sound Like When a Computer Turns Them into Piano Music", May 7, 2014, TIME, http://www.time.com/90259/classic-novels-music/, retrieved on Aug. 27, 2018, 4 pages.

Strauss, "Researchers Train Computers to Manipulate Human Emotions with Art", io9, May 12, 2014, https://io9.gizmodo.com/researchers-train-computers-to-manipulate-human-emotion-1574939380, retrieved on Aug. 27, 2018, 2 pages.

Tomohiro, "Program that can Make Original Music from Your Favorite Novel 'TransProse'", Gizmodo Japan, May 24, 2014, https://www.gizmodo.jp/2014/05/transprose.html, retrieved on Aug. 27, 2018, 6 pages.

\* cited by examiner

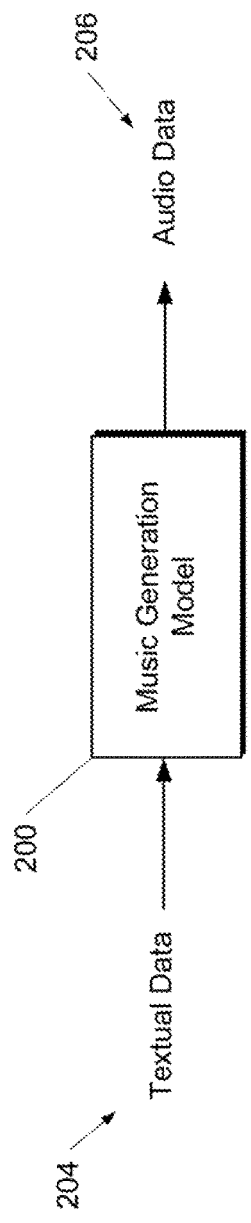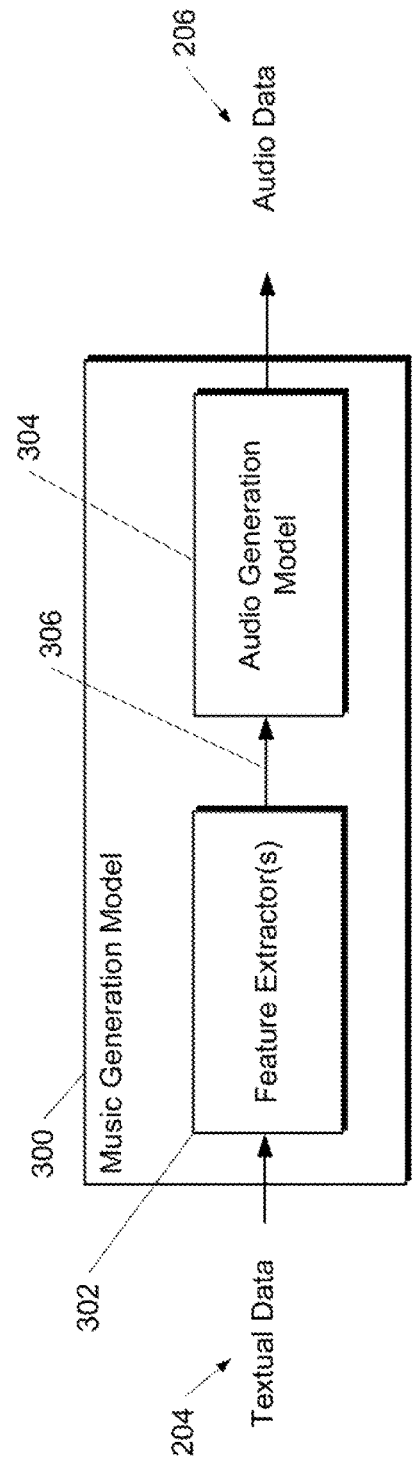

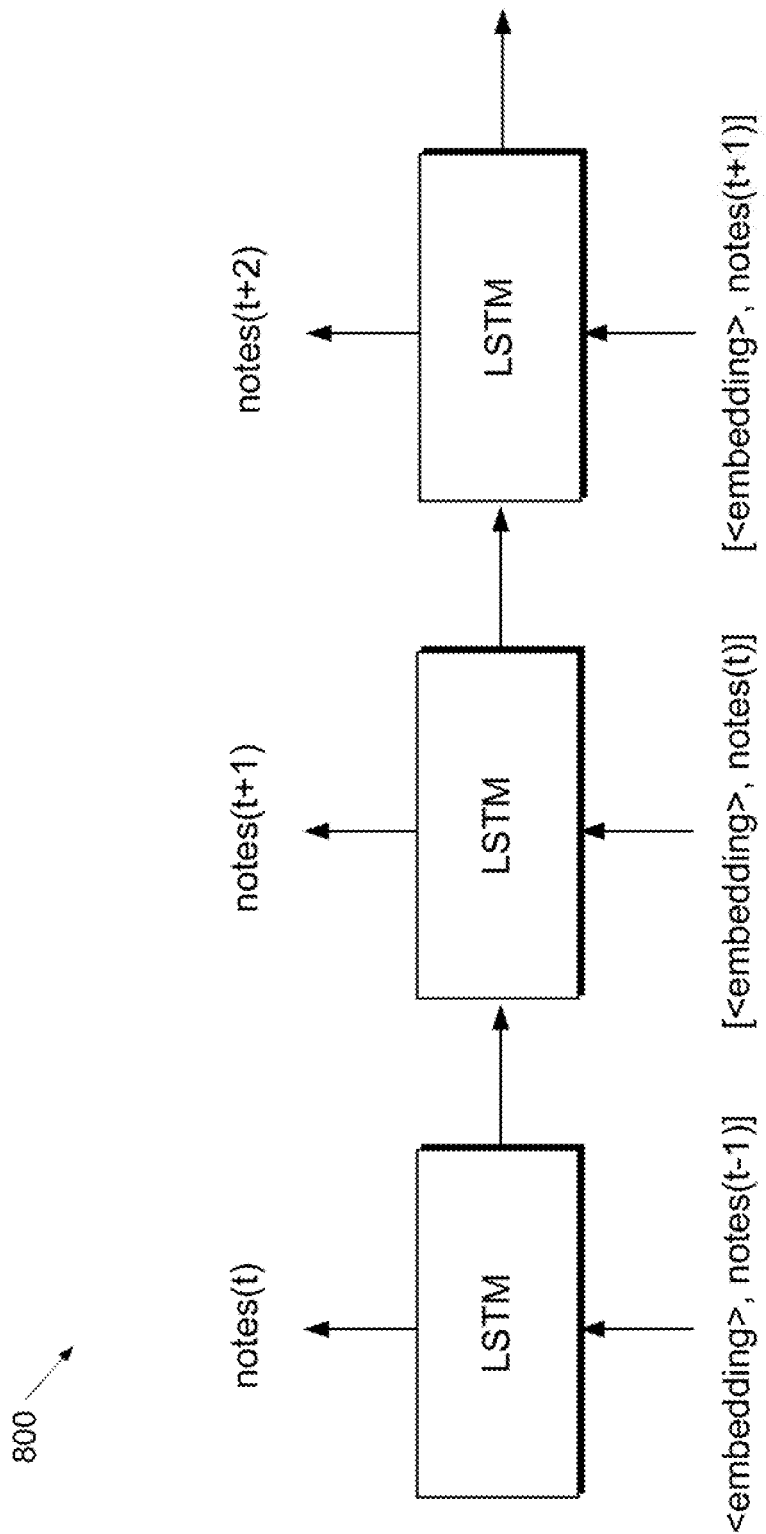

MACHINE LEARNING TO GENERATE MUSIC FROM TEXT

FIELD

The present disclosure relates generally to machine learning. More particularly, the present disclosure relates to machine learning to generate music from text.

BACKGROUND

Algorithmic composition refers to the use of algorithms (e.g., computer-implemented algorithms) to create music. For example, certain existing music generation algorithms can include one or more computational models.

One of the most difficult challenges posed by algorithmic composition is to successfully incorporate the concept of creativity within the algorithm and the resulting generated music. In particular, creativity is a nebulous concept and algorithm designers typically do not have a clear idea or mechanism of how to express or generate creativity within their music generation algorithms.

As such, one significant disadvantage of most music generation algorithms is that the music that they produce is generally meaningless: since the computers do not have feelings, moods, or intentions, they do not try to describe something with their music in the way that humans do. By contrast, most of human music is referential or descriptive. The reference can be something abstract like an emotion, or something more objective such as a picture or a landscape.

Another major disadvantage associated with algorithmically-generated music is that it typically lacks consistency or structure. Thus, another big challenge of algorithmic composition is creating an algorithm that generates a piece of music that exhibits a globally consistent theme or structure across the entirety of the piece. More particularly, while certain existing techniques may be able to generate snippets of music, such techniques are typically unable to generate an entire piece of music that exhibits a globally consistent theme and/or structure. Thus, a technical challenge exists which can be summarized as the current inability to algorithmically generate music that exhibits a globally consistent theme and/or structure.

SUMMARY

Aspects and advantages of embodiments of the present disclosure will be set forth in part in the following description, or can be learned from the description, or can be learned through practice of the embodiments.

One example aspect of the present disclosure is directed to a computer system to generate music from text. The computer system includes a feature extractor configured to extract one or more structural features from an input text. The one or more structural features are indicative of a structure associated with the input text. The computer system includes a machine-learned audio generation model configured to obtain the one or more structural features from the feature extractor and generate a musical composition from the input text based at least in part on the one or more structural features. The computer system includes one or more processors and one or more non-transitory computer-readable media that collectively store instructions that, when executed by the one or more processors cause the computer system to: obtain the input text; input the input text into the feature extractor; receive the one or more structural features as an output of the feature extractor; input the one or more structural features into the machine-learned audio generation model; and receive data descriptive of the musical composition as an output of the machine-learned audio generation model.

Another example aspect of the present disclosure is directed to a computer-implemented method to generate music from text. The method includes obtaining, by one or more computing devices, an input text that includes a plurality of portions. The method includes inputting, by the one or more computing devices, the input text into a feature extractor that is configured to extract at least one structural feature from each of the plurality portions of the input text. The method includes receiving, by the one or more computing devices, a sequence of structural features as an output of the feature extractor. The sequence of structural features includes the at least one structural feature extracted from each of the plurality portions of the input text. The method includes inputting, by the one or more computing devices, the sequence of structural features into a machine-learned audio generation model. The method includes receiving, by the one or more computing devices, data descriptive of a musical composition generated by the machine-learned audio generation model based at least in part on the sequence of structural features.

Another example aspect of the present disclosure is directed to one or more tangible, non-transitory computer-readable media that store instructions that, when executed by one or more processors, cause a computing system to perform operations. Execution of the instructions causes the computing system to obtain an input text that includes a plurality of portions. Execution of the instructions causes the computing system to generate a sequence of features for the poem. The sequence of features includes a plurality of feature groups that respectively correspond to the plurality of portions of the input text. Execution of the instructions causes the computing system to input the sequence of features into a machine-learned audio generation model. Execution of the instructions causes the computing system to receive data descriptive of a musical composition as an output of the machine-learned audio generation model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 2 depicts a block diagram of an example music generation model according to example embodiments of the present disclosure.

FIG. 3 depicts a block diagram of an example music generation model according to example embodiments of the present disclosure.

FIG. 8 depicts a diagram of an example structure of an example audio generation model according to example embodiments of the present disclosure.

Figure 1A:
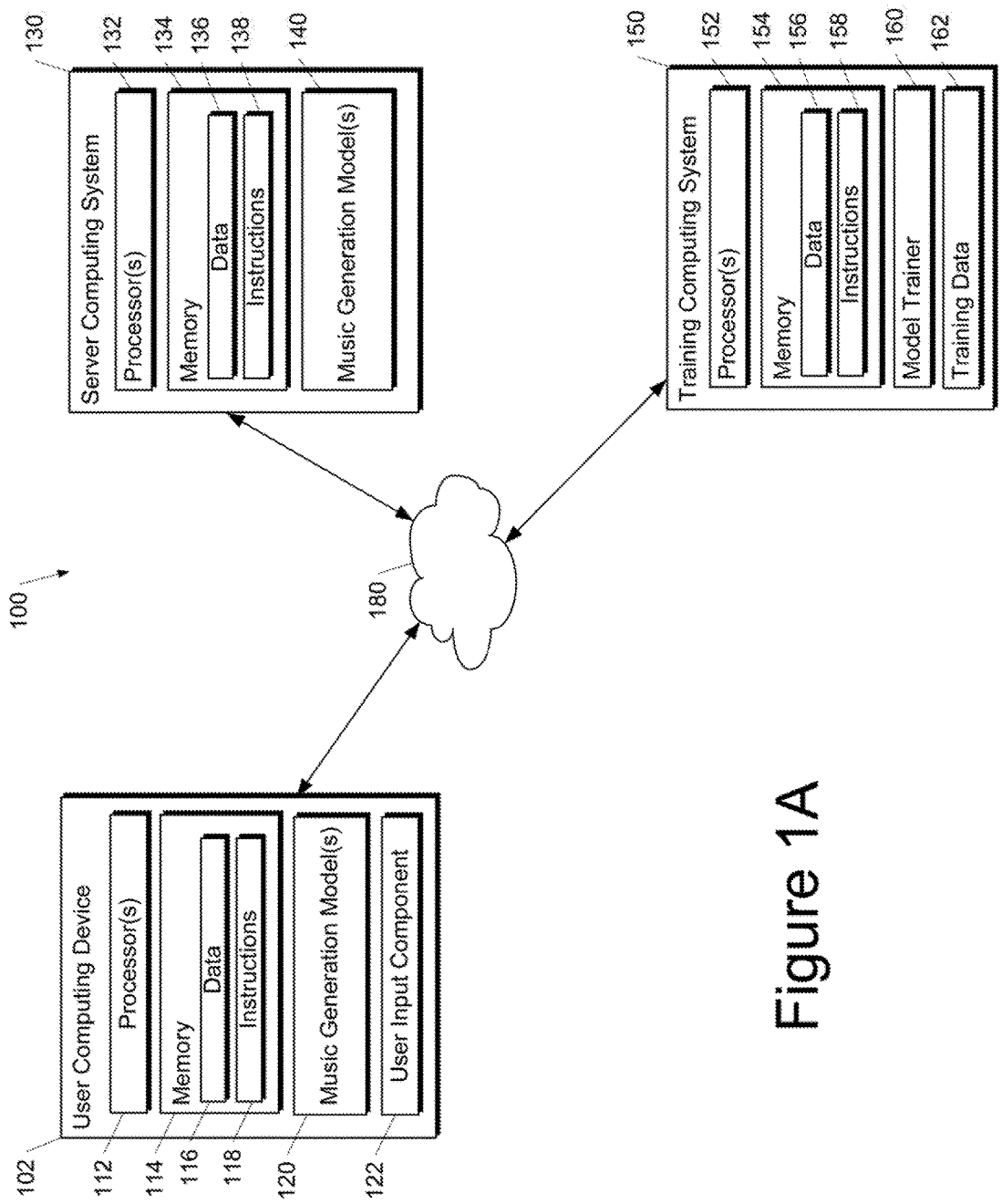
FIG. 1A depicts a block diagram of an example computing system that generates music from text according to example embodiments of the present disclosure.

Reference numerals that are repeated across plural figures are intended to identify the same features in various implementations.

DETAILED DESCRIPTION

Overview

Generally, the present disclosure is directed to systems and methods that leverage one or more machine-learned models to generate music from text. In particular, according to an aspect of the present disclosure, a computing system can include a music generation model that is operable to extract one or more structural features from an input text. The one or more structural features can be indicative of a structure associated with the input text. The music generation model can generate a musical composition from the input text based at least in part on the one or more structural features. For example, the music generation model can generate a musical composition that exhibits a musical structure that mimics or otherwise corresponds to the structure associated with the input text. In such fashion, the systems and methods of the present disclosure can generate music that exhibits a globally consistent theme and/or structure.

More particularly, the systems and methods of the present disclosure can obtain an input text from which a musical composition is to be generated. As one example, the input text can be a poem. As another example, the input text can be a textual conversation extracted or otherwise obtained from a text messaging application, a group chat application, an electronic mail application, or other messaging application. Similarly, the input text can include one or more social media postings. As further examples, input texts can be extracted or otherwise obtained from a news article, a webpage, a novel, a screenplay, a document, a dictated text from spoken words (e.g., a text obtained by inputting a video or other audio source through a speech-to-text translator), or any other form of text.

In some implementations, the input text can include a plurality of portions. As an example, a poem can have a plurality of lines. For example, the lines of a poem can be separated by line breaks. As another example, a textual conversation can include a plurality of textual messages, where each message has a sender associated therewith. As further examples, a segmentation component can be used to segment an input text into a plurality of portions based on line breaks, page breaks, paragraph breaks, chapter breaks, speaker identity (e.g., in the case of a screenplay or novel with conversation), or other parameters.

According to an aspect of the present disclosure, a computing system can include a music generation model that is operable to extract one or more structural features from an input text. In particular, in some implementations, the music generation model can include a feature extractor that extracts the one or more structural features. As will be discussed further below, the music generation model can further include a machine-learned audio generation model that generates a musical composition based at least in part on the extracted structural features.

In some implementations in which the input text includes a plurality of portions, the feature extractor can extract one or more structural features from each of the plurality of portions. In some implementations, the extracted structural features can form a sequence of structural features for the input text. For example, the one or more structural features extracted from each of the plurality of portions can be concatenated according to an order associated with the plurality of portions to form the sequence of structural features.

As one example structural feature, the systems and methods of the present disclosure can determine a rhyme scheme for the input text. As an example, in implementations in which the input text is a poem, the feature extractor can be configured to determine a rhyme scheme that is descriptive of a pattern of rhymes exhibited by a plurality of lines of the poem. For example, one example technique that can be performed by the feature extractor to determine the rhyme scheme is described in Reddy et al., "Unsupervised Discovery of Rhyme Schemes." *Proceedings of the 49th Annual Meeting of the Association for Computational Linguistics: Human Language Technologies: Short Papers*, pages 77-82, Association for Computational Linguistics, 2011. Other techniques can be used as well. In addition, rhyme scheme detection techniques can be applied to texts that were not explicitly drafted as poems as well.

To provide a simplified example, the following poem demonstrates an example rhyme scheme using, as an example convention, letters to indicate which lines rhyme (that is, lines designated with the same letter all rhyme with each other): Once when the snow of the year was beginning to fall, [A] We stopped by a mountain pasture to say, "Whose colt?" [B] A little Morgan had one forefoot on the wall, [A] The other curled at his breast. He dipped his head [C] And snorted to us. And then we saw him bolt. [B] We heard the miniature thunder where he fled, [C] . . . .

As another example structural feature, the systems and methods of the present disclosure can determine one or more mood features for the input text. For example, the feature extractor can perform semantical analysis on the input text to extract the one or more mood features. As an example, in some implementations in which the input text includes a plurality of portions, the feature extractor can extract one or more mood features from each of the plurality of portions. The mood feature for each portion can be descriptive of a mood associated with such portion. Example mood features can include happy, sad, optimistic, melancholic, etc.

For example, one example technique that can be performed by the feature extractor to determine the mood features for the input text is described in Alm et al., "Emotions from Text: Machine Learning for Text-Based Emotion Prediction." *Proceedings of Human Language*

*Technology Conference and Conference on Empirical Methods in Natural Language Processing*, pages 579-586, Association for Computational Linguistics, 2005. Other techniques can be used as well.

As yet another example structural feature, the systems and methods of the present disclosure can determine one or more subject matter features for the input text. For example, the feature extractor can perform semantical analysis on the input text to extract the one or more subject matter features. As an example, in some implementations in which the input text includes a plurality of portions, the feature extractor can extract one or more subject matter features from each of the plurality of portions. The subject matter feature for each portion can be descriptive of a subject associated with such portion. Example subject matter features can include snow, mountain_pasture, child, thunder, etc. In some implementations, various natural language processing techniques can be performed to extract the one or more subject matter features for the input text.

According to another aspect of the present disclosure, in some implementations, the music generation model can further include a machine-learned deep neural network. The deep neural network can receive some or all of the input text and, in response, provide one or more musical embeddings for the input text. As an example, the deep neural network can respectively receive each portion of the input text and, in response, respectively provide at least one musical embedding for each portion of the input text. Thus, the deep neural network can provide a sequence of musical embeddings, where each of the musical embeddings corresponds to one of the portions of the input text.

In some implementations, the musical embedding can be obtained from the deep neural network at a hidden layer of the deep neural network. For example, such hidden layer can be one of the last, but not final, layers of the deep neural network. In addition, in some implementations, the deep neural network can include one or more convolutional neural networks, one or more recurrent neural networks (e.g., long short-term memory recurrent neural networks), or combinations thereof.

According to another aspect of the present disclosure, in some implementations, the machine-learned deep neural network can be trained on or using a training dataset that includes a plurality of sets of lyrics from humanly-generated songs, wherein each set of lyrics is labeled with one or more music features descriptive of the backing music associated with such set of lyrics in the corresponding humanly-generated song. In some instances, the music features can be musical scalar features, binary features, and/or other types of features. Example music features include a tempo feature, a loudness feature, a dynamic feature, a pitch histogram feature, a dominant melodic interval feature, a direction of motion feature, and a dominant harmony feature.

As examples: a tempo feature can describe a tempo of the backing music or portion of the song associated with the particular set of lyrics. A loudness feature can describe a loudness of the backing music for the set of lyrics, relative to the whole music piece. A dynamic feature can describe an estimate of the loudness variation in the particular portion of the song. A pitch histogram feature can describe how much time each of the twelve notes have been played in the portion of the song. A dominant melodic interval feature can describe a most used interval (e.g., pitch-distance between two notes). As a simplified example, a minor third interval gives a perception of "sadness" while a major third gives a sense of "happiness." A direction of motion feature can describe whether the pitches are ascending or descending in the portion of the song. This can give an estimate of the perception of "flow" of music. A dominant harmony feature can describe a most used vertical interval (e.g., similar to the melodic interval described above, expect that in this case the notes are not successive but are simultaneous).

Thus, a deep neural network model can be trained to predict some or all of the music features described above, when given the corresponding set of lyrics or text. Further, use of an embedding from a hidden layer provides a machine-learned representation of relationships that is more subtle and general than use of the specific music features described above. For example, the embedding provides predictions in a machine-learned dimensional representation, rather than the humanly-conceived dimensions associated with the music features.

In some implementations, multiple different deep neural networks can be trained as described above on different respective training datasets that include different respective genres of music. For example, a first deep neural network can be trained as described above on rap music or spoken word while a second deep neural network can be trained as described above on country western music. In some implementations, a user can select which of such genre-specific networks is used by the music generation model to generate the musical composition from the input text. Enabling such network genre selection by a user can allow the user to guide the music generation model to generate music from the input text that has a user-desired genre.

In yet further implementations, a deep neural network can be trained as described above on a set of songs that are explicitly provided or selected by the user. Thus, the user can obtain a personalized deep neural network trained on user-specified music. Such can enable the user to guide the music generation model to generate music from the input text that fits the user's personal tastes in music.

According to another aspect of the present disclosure, in some implementations, the music generation model can include a machine-learned audio generation model. The machine-learned audio generation model can have been trained to receive the one or more structural features from the feature extractor and/or receive the one or more musical embeddings from the deep neural network. The audio generation model can generate a musical composition from the input text based at least in part on the one or more structural features and/or based at least in part on the one or more musical embeddings.

As an example, in some implementations, the sequence of structural features can be merged with the sequence of musical features to form a merged sequence of features. The merged sequence of features can be input into the audio generation model and the audio generation model can generate the musical composition based on the merged sequence of features. To provide one example, the example rhyme scheme described above could be merged with a sequence of musical features to form the following example merged sequence of features:

[(A, [10, 52, 18, 81, 56]),
(B, [25, 85, 16, 62, 91]),
(A, [59, 35, 98, 41, 0]),
(C, [88, 24, 39, 99, 98]),
(B, [1, 25, 66, 88, 19]),
(C, [74, 15, 2, 83, 44])]

More or fewer features than those provided in the example above can be used. Alternative features can be used as well. For example, each subset of features in the sequence could further include a mood feature, a subject matter feature, or other structural features. The audio generation model can generate the musical composition from whichever features are provided.

In some implementations, the audio generation model can include one or more machine-learned generative adversarial networks. In some implementations, the audio generation model can include a conditional generative model able to generate a melody conditioned on the features.

In some implementations, an autoregressive model (e.g., a long short-term memory recurrent neural network) can be trained to construct the musical composition one note at a time based on the previous context. For example, the context at time t can include the notes generated thus far, combined with the features. Once trained, such autoregressive model can be used to generate new compositions conditionally. For example, the notes generated at time t by the model can be fed back in as inputs. The performance of such a model can be improved by using adversarial training, where the model is rewarded when it successfully fools a classifier into thinking that it has generated music similar to those pieces found in the training set.

The resulting compositions can be rendered as audio using music production software. Alternatively, an additional generative model can be used to generate audio conditioned on these compositions.

Thus, the present disclosure provides systems and methods that leverage one or more machine-learned models to generate music from text. In particular, the present disclosure provides music generation models that are operable to extract one or more structural features from an input text that are indicative of a structure associated with the input text. The music generation model can generate a musical composition that exhibits a musical structure that mimics or otherwise corresponds to the structure associated with the input text. In such fashion, the systems and methods of the present disclosure provide a technical solution that enables generation of music that exhibits a globally consistent theme and/or structure, thereby resolving the technical problem of the current inability to algorithmically generate music that exhibits a globally consistent theme and/or structure.

In some implementations, the systems and methods of the present disclosure can be included or otherwise employed within the context of an application (e.g., a group chat application), a browser plug-in, or in other contexts. Thus, in some implementations, the music generation models of the present disclosure can be included in or otherwise stored and implemented by a user computing device such as a laptop, tablet, or smartphone. As yet another example, the music generation models can be included in or otherwise stored and implemented by a server computing device that communicates with the user computing device according to a client-server relationship. For example, the music generation models of the present disclosure can be implemented by the server computing device as a portion of a web service (e.g., a web email service) or as a function that the user computing device can call from the server computing device (e.g., via an application programming interface).

With reference now to the Figures, example embodiments of the present disclosure will be discussed in further detail.

Example Devices and Systems

FIG. 1A depicts a block diagram of an example computing system 100 that generates music from text according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more music generation models 120. For example, the music generation models 120 can be or can otherwise include various machine-learned models such as neural networks (e.g., deep neural networks) or other multi-layer non-linear models. Neural networks can include recurrent neural networks (e.g., long short-term memory recurrent neural networks), convolutional neural networks, feed-forward neural networks, or other forms of neural networks. Example music generation models 120 are discussed with reference to FIGS. 2-4.

In some implementations, the one or more music generation models 120 can be received from the server computing system 130 over network 180, stored in the user computing device memory 114, and the used or otherwise implemented by the one or more processors 112. In some implementations, the user computing device 102 can implement multiple parallel instances of a single music generation model 120 (e.g., to perform parallel music generation across multiple instances of the models 120).

More particularly, the music generation model 120 can be operable to extract one or more structural features from an input text. The one or more structural features can be indicative of a structure associated with the input text. The music generation model 120 can generate a musical composition from the input text based at least in part on the one or more structural features. For example, the music generation model 120 can generate a musical composition that exhibits a musical structure that mimics or otherwise corresponds to the structure associated with the input text. In such fashion, the music generation model 120 can generate music that exhibits a globally consistent theme and/or structure.

Additionally or alternatively, one or more music generation models 140 can be included in or otherwise stored and implemented by the server computing system 130 that communicates with the user computing device 102 according to a client-server relationship. For example, the music generation models 140 can be implemented by the server computing system 140 as a portion of a web service (e.g., a text messaging service, an electronic email service, a music generation service, etc.). Thus, one or more models 120 can be stored and implemented at the user computing device 102 and/or one or more models 140 can be stored and implemented at the server computing system 130. For example, the server computing system 130 can provide use of the models 140 as a service to the user computing device 102.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication or other text.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned music generation models 140. For example, the music generation models 140 can be or can otherwise include various machine-learned models such as neural networks (e.g., deep recurrent neural networks) or other multi-layer non-linear models. Example music generation models 140 are discussed with reference to FIGS. 2-4.

The music generation model 140 can be operable to extract one or more structural features from an input text. The one or more structural features can be indicative of a structure associated with the input text. The music generation model 140 can generate a musical composition from the input text based at least in part on the one or more structural features. For example, the music generation model 140 can generate a musical composition that exhibits a musical structure that mimics or otherwise corresponds to the structure associated with the input text.

The server computing system 130 can train the music generation models 120 and 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train a music generation model 120 or 140 or portions thereof based on a set of training data 162. In some implementations, the music generation models 120 or 140 can include deep neural network that provides a musical embedding for an input text (e.g., for each of one or more portions of the input text). In some of such implementations, deep neural network can be trained on or using a training dataset 162 that includes a plurality of sets of lyrics from humanly-generated songs, wherein each set of lyrics is annotated with one or more music features descriptive of the backing music associated with such set of lyrics in the corresponding humanly-generated song. Example music features include a tempo feature, a loudness feature, a dynamic feature, a pitch histogram feature, a dominant melodic interval feature, a direction of motion feature, and a dominant harmony feature.

In some implementations, multiple different deep neural networks can be trained as described above on different respective training datasets 162 that include different respective genres of music. For example, a first deep neural network can be trained as described above on rap music or spoken word while a second deep neural network can be trained as described above on country western music. In some implementations, a user can select which of such genre-specific networks is used by the music generation model 120 or 140 to generate the musical composition from the input text. Enabling such network genre selection by a user can allow the user to guide the music generation model 120 or 140 to generate music from the input text that has a user-desired genre.

In yet further implementations, a deep neural network can be trained as described above on a set of songs that are explicitly provided or selected by the user. Thus, the user can obtain a personalized deep neural network trained on user-specified music. Such can enable the user to guide the music generation model to generate music from the input text that fits the user's personal tastes in music.

In some implementations, if the user has provided consent, the training examples 162 can be provided by the user computing device 102 or otherwise procured from data associated with the user. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the music generation models 120 can be both trained and used locally at the user computing device 102. In some of such implementations, the user computing device 102 can implement the model trainer 160 to personalize the music generation models 120 based on user-specific data.

Figure 1B:
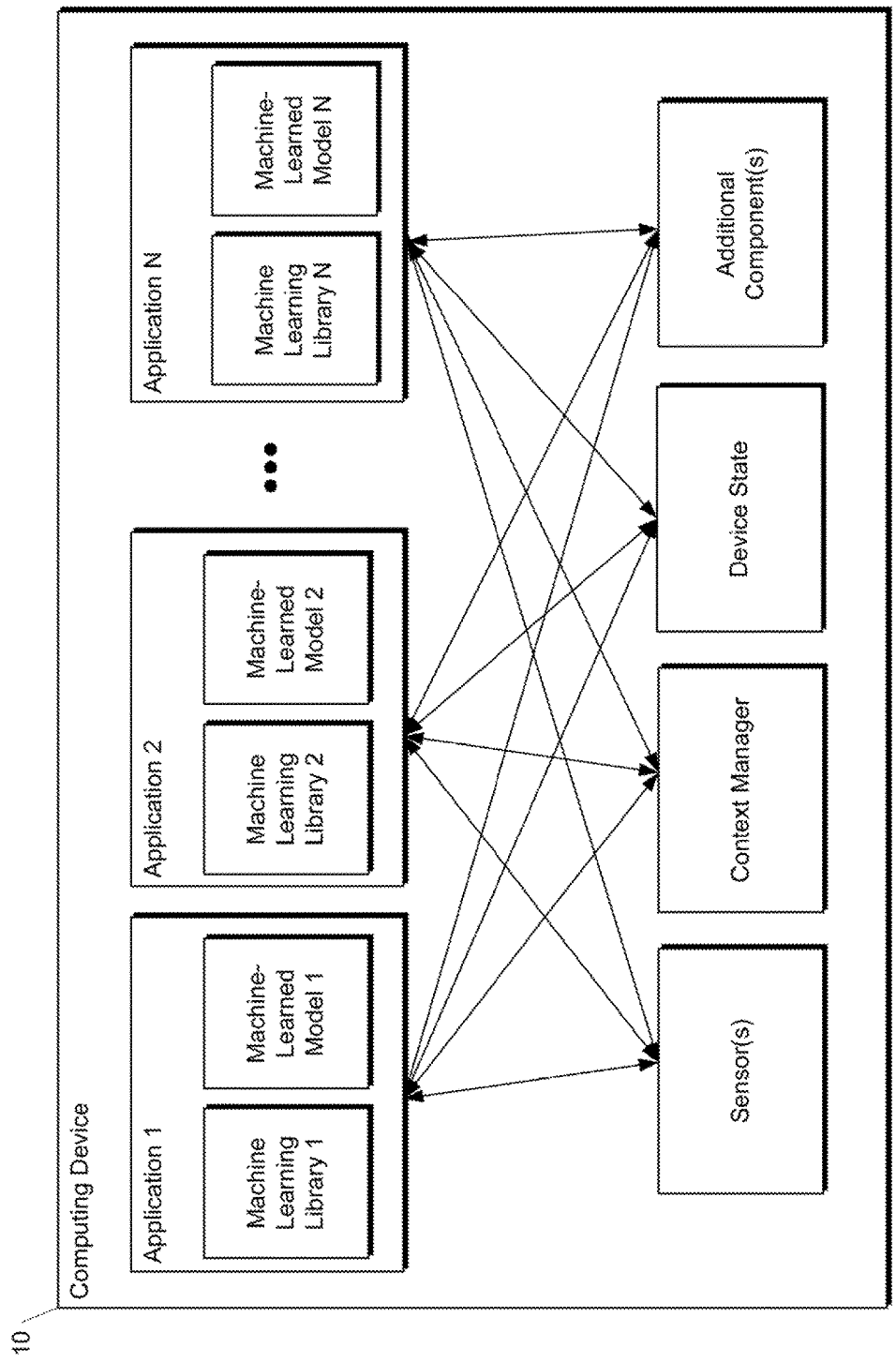
FIG. 1B depicts a block diagram of an example computing device that generates music from text according to example embodiments of the present disclosure.

FIG. 1B depicts a block diagram of an example computing device 10 that performs music generation according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned music generation model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
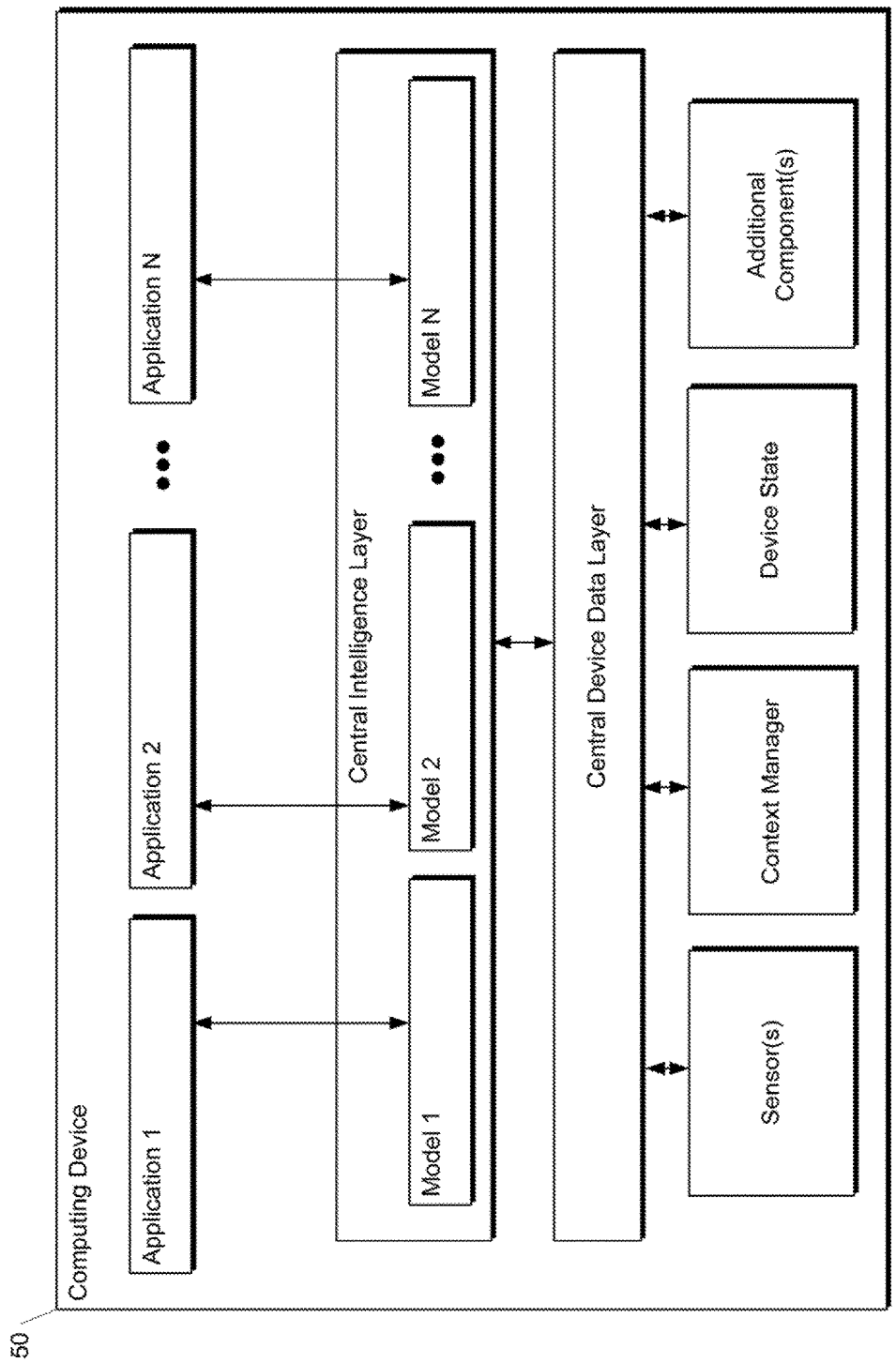
FIG. 1C depicts a block diagram of an example computing device that generates music from text according to example embodiments of the present disclosure.

FIG. 1C depicts a block diagram of an example computing device 50 that performs music generation according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a music generation model) can be provided for each application and managed by the central intelligence layer. In other implementations, two or more applications can share a single machine-learned model. For example, in some implementations, the central intelligence layer can provide a single model (e.g., a single music generation model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

FIG. 2 depicts a block diagram of an example music generation model 200 according to example embodiments of the present disclosure. In some implementations, the music generation model 200 is trained to receive a set of textual data 204 descriptive of an input text and, as a result of receipt of the textual data 204, provide audio data 206 that corresponds to a musical composition generated by the music generation model 200 based on the input text.

As one example, the input text can be a poem. As another example, the input text can be a textual conversation extracted or otherwise obtained from a text messaging (e.g., SMS) application, a group chat application, an electronic mail application, or other messaging application. Similarly, the input text can include one or more social media postings. As further examples, input texts can be extracted or otherwise obtained from a news article, a webpage, a novel, a screenplay, a document, a dictated text from spoken words (e.g., a text obtained by inputting a video or other audio source through a speech-to-text translator), or any other form of text.

In some implementations, the input text can include a plurality of portions. As an example, a poem can have a plurality of lines. For example, the lines of a poem can be separated by line breaks. As another example, a textual conversation can include a plurality of textual messages, where each message has a sender associated therewith. As further examples, a segmentation component can be used to segment an input text into a plurality of portions based on line breaks, page breaks, paragraph breaks, chapter breaks, speaker identity (e.g., in the case of a screenplay or novel with conversation), or other parameters. In another example, portions of an input text can respectively correspond to a plurality of social media postings. For example, one-year's worth of social media postings can be input into the music generation model 200 to obtain a year-in-review musical composition.

The music generation model 200 can generate the audio data 206 that corresponds to a musical composition from the input text. For example, the music generation model 200 can generate a musical composition that exhibits a musical structure that mimics or otherwise corresponds to the input text. In such fashion, the music generation model 200 can generate music that exhibits a globally consistent theme and/or structure. In some implementations, the audio data 206 is descriptive of audio (e.g., an MP3 file) while in other implementations the audio data 206 is descriptive of musical notes (e.g., some indication of notes that form the musical composition). Thus, the audio data 206 output by the music generation model 200 can be actual playback of the musical composition or can be information that is simply descriptive of the musical composition.

FIG. 3 depicts a block diagram of an example music generation model 300 according to example embodiments of the present disclosure. The music generation model 300 is similar to music generation model 200 of FIG. 2 except that music generation model 300 includes one or more feature extractors 302 and an audio generation model 304.

The one or more feature extractors 302 can extract one or more structural features 306 from the textual data 204. In some implementations in which the input text includes a plurality of portions, the feature extractor(s) 302 can extract one or more structural features 306 from each of the plurality of portions. In some implementations, the extracted structural features 306 can form a sequence of structural features for the input text. For example, the one or more structural features 306 extracted from each of the plurality of portions can be concatenated according to an order associated with the plurality of portions to form the sequence of structural features.

As one example structural feature 306, the systems and methods of the present disclosure can determine a rhyme scheme for the input text. As an example, in implementations in which the input text is a poem, the feature extractor(s) 302 can be configured to determine a rhyme scheme that is descriptive of a pattern of rhymes exhibited by a plurality of lines of the poem. For example, one example technique that can be performed by the feature extractor to determine the rhyme scheme is described in Reddy et al., "Unsupervised Discovery of Rhyme Schemes." *Proceedings of the* 49*th Annual Meeting of the Association for Computational Linguistics: Human Language Technologies: Short Papers*, pages 77-82, Association for Computational Linguistics, 2011. Other techniques can be used as well. In addition, rhyme scheme detection techniques can be applied to texts that were not explicitly drafted as poems as well.

To provide a simplified example, the following poem demonstrates an example rhyme scheme using, as an example convention, letters to indicate which lines rhyme (that is, lines designated with the same letter all rhyme with each other): Once when the snow of the year was beginning to fall, [A] We stopped by a mountain pasture to say, "Whose colt?" [B] A little Morgan had one forefoot on the wall, [A] The other curled at his breast. He dipped his head [C] And snorted to us. And then we saw him bolt. [B] We heard the miniature thunder where he fled, [C] . . . .

As another example structural feature 306, the feature extractor(s) 302 can determine one or more mood features for the input text. For example, the feature extractor(s) 302 can perform semantical analysis on the input text to extract the one or more mood features. As an example, in some implementations in which the input text includes a plurality of portions, the feature extractor(s) 302 can extract one or more mood features from each of the plurality of portions. The mood feature for each portion can be descriptive of a mood associated with such portion. Example mood features can include happy, sad, optimistic, melancholic, etc.

As yet another example structural feature 306, the feature extractor(s) 302 can determine one or more subject matter features for the input text. For example, the feature extractor(s) 302 can perform semantical analysis on the input text to extract the one or more subject matter features. As an example, in some implementations in which the input text includes a plurality of portions, the feature extractor(s) 302 can extract one or more subject matter features from each of the plurality of portions. The subject matter feature for each portion can be descriptive of a subject associated with such portion. Example subject matter features can include snow, mountain_pasture, child, thunder, etc.

The audio generation model 304 can be configured to receive the one or more structural features 306 from the feature extractor(s) 302. The audio generation model 304 can generate the audio data 206 descriptive of the musical composition from the input text based at least in part on the one or more structural features 306.

In some implementations, the audio generation model 304 can include one or more machine-learned generative adversarial networks. In some implementations, the audio generation model 304 can include a conditional generative model able to generate a melody conditioned on the features 306.

In some implementations, an autoregressive model (e.g., a long short-term memory recurrent neural network) can be trained to construct the musical composition one note at a time based on the previous context. For example, the context at time t can include the notes generated thus far, combined with the features 306.

Once trained, such autoregressive model can be used to generate new compositions conditionally. For example, the notes generated at time t by the model can be fed back in as inputs. The performance of such a model can be improved by using adversarial training, where the model is rewarded when it successfully fools a classifier into thinking that it has generated music similar to those pieces found in the training set.

The resulting compositions can be rendered as audio using music production software. Alternately, an additional generative model can be used to generate audio conditioned on these compositions.

Figure 4:
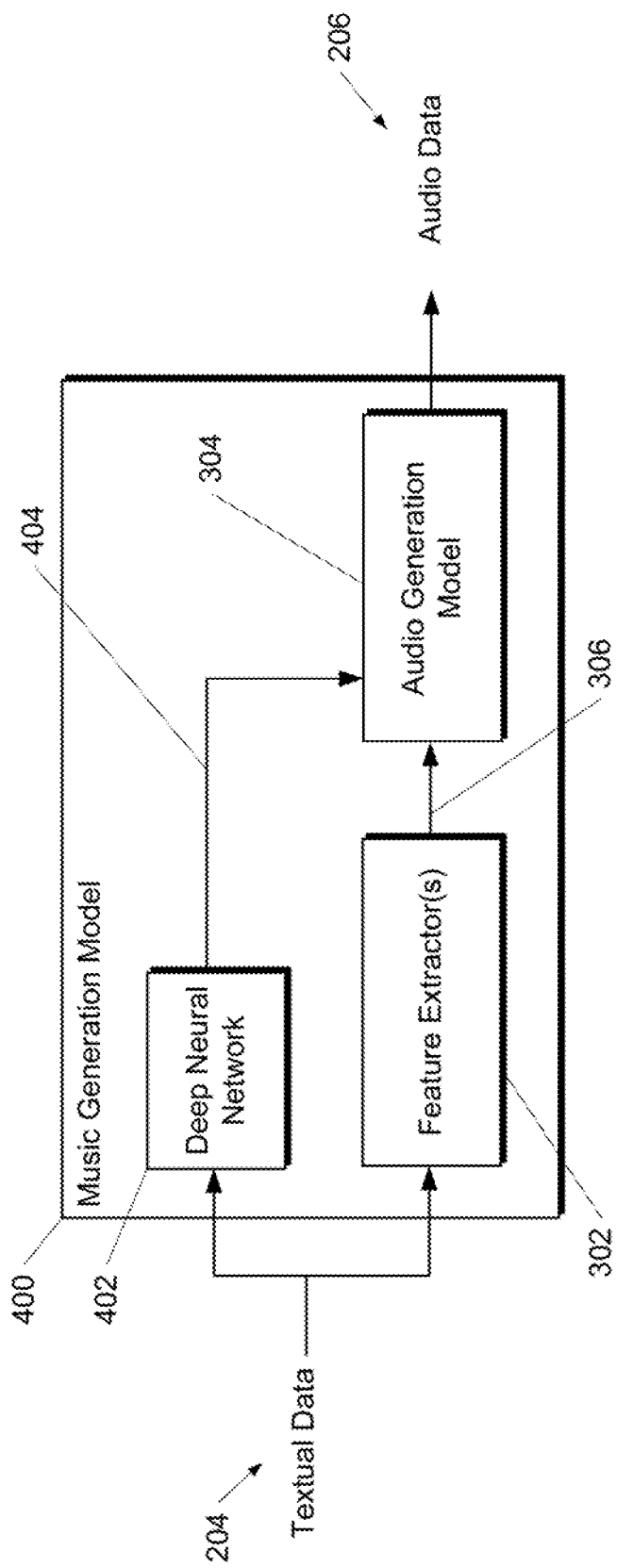
FIG. 4 depicts a block diagram of an example music generation model according to example embodiments of the present disclosure.

As another example music generation model structure, FIG. 4 depicts a block diagram of an example music generation model 400 according to example embodiments of the present disclosure. The music generation model 400 is similar to music generation model 300 of FIG. 3 except that music generation model 400 further includes a deep neural network 402.

The deep neural network 402 can receive some or all of the textual data 204 and, in response, provide one or more musical embeddings 404 for the input text. As an example, the deep neural network 402 can respectively receive each portion of the input text and, in response, respectively provide at least one musical embedding 404 for each portion of the input text. Thus, the deep neural network 402 can provide a sequence of musical embeddings 404, where each of the musical embeddings 404 corresponds to one of the portions of the input text.

In some implementations, each musical embedding 404 can be obtained from the deep neural network 402 at a hidden layer of the deep neural network 402. For example, such hidden layer can be one of the last, but not final, layers of the deep neural network 402. In addition, in some implementations, the deep neural network 402 can include one or more convolutional neural networks, one or more recurrent neural networks (e.g., long short-term memory recurrent neural networks), or combinations thereof.

Figure 7:
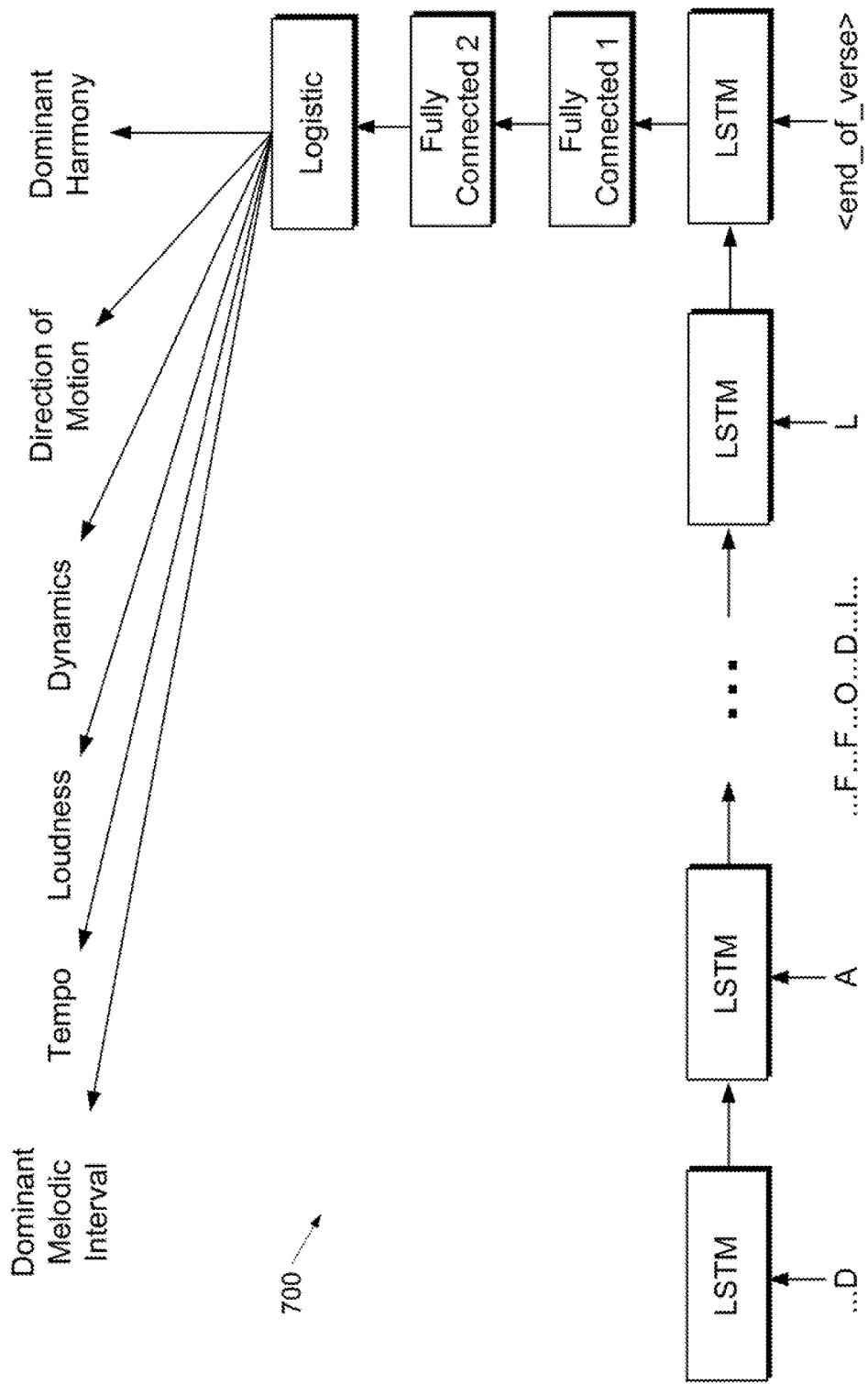
FIG. 7 depicts a diagram of an example structure of an example deep neural network to provide musical embeddings according to example embodiments of the present disclosure.

As one example structure for the deep neural network 402, FIG. 7 depicts a diagram of an example structure of an example deep neural network 700 to provide musical embeddings according to example embodiments of the present disclosure. The deep neural network 700 includes a character-based long short-term memory layer followed by two fully connected layers. In some implementations, the inputs to the logistic layer (e.g., the outputs of the second fully connected layer) can be used as the musical embeddings 404.

Although FIG. 7 illustrates a single word (e.g., "daffodil") being entered (e.g., character-by-character) into the model 700, the model 700 is not limited to entry of a single word to generate the embedding. Instead, in some implementations, an entire verse is entered (e.g., character-by-character or word-by-word) into the model 700 to generate a single embedding for such entire verse.

Referring again to FIG. 4, according to another aspect of the present disclosure, in some implementations, the machine-learned deep neural network 402 can be trained on or using a training dataset that includes a plurality of sets of lyrics from humanly-generated songs, wherein each set of lyrics is annotated with one or more music features descriptive of the backing music associated with such set of lyrics in the corresponding humanly-generated song. Example music features include a tempo feature, a loudness feature, a dynamic feature, a pitch histogram feature, a dominant melodic interval feature, a direction of motion feature, and a dominant harmony feature.

As examples: a tempo feature can describe a tempo of the backing music or portion of the song associated with the particular set of lyrics. A loudness feature can describe a loudness of the backing music for the set of lyrics, relative to the whole music piece. A dynamic feature can describe an estimate of the loudness variation in the particular portion of the song. A pitch histogram feature can describe how much time each of the twelve notes have been played in the portion of the song. A dominant melodic interval feature can describe a most used interval (e.g., pitch-distance between two notes). As a simplified example, a minor third interval gives a perception of "sadness" while a major third gives a sense of "happiness." A direction of motion feature can describe whether the pitches are ascending or descending in the portion of the song. This can give an estimate of the perception of "flow" of music. A dominant harmony feature can describe a most used vertical interval (e.g., similar to the melodic interval described above, expect that in this case the notes are not successive but are simultaneous).

Thus, a deep neural network model 402 can be trained to predict some or all of the music features described above, when given the corresponding set of lyrics or text. Further, use of an embedding from a hidden layer provides a machine-learned representation of relationships that is more subtle and general than use of the specific music features described above. For example, the embedding provides predictions in a machine-learned dimensional representation, rather than the humanly-conceived dimensions associated with the music features.

In some implementations, multiple different deep neural networks 402 can be trained as described above on different respective training datasets that include different respective genres of music. For example, a first deep neural network 402 can be trained as described above on rap music or spoken word while a second deep neural network can be trained as described above on country western music. In some implementations, a user can select which of such genre-specific networks 402 is used by the music generation model 400 to generate the audio data 206 from the textual data 204. One model 402 can be used or plural models 402 can be used in parallel. Enabling such network genre selection by a user can allow the user to guide the music generation model 400 to generate music from the input text that has a user-desired genre.

In yet further implementations, a deep neural network 402 can be trained as described above on a set of songs that are explicitly provided or selected by the user. Thus, the user can obtain a personalized deep neural network 402 trained on user-specified music. Such can enable the user to guide the music generation model 400 to generate music from the input text that fits the user's personal tastes in music.

The machine-learned audio generation model 304 can be configured to receive the one or more structural features 306 from the feature extractor(s) 302 and receive the one or more musical embeddings 404 from the deep neural network 402. The audio generation model 304 can generate a musical composition from the input text based at least in part on the one or more structural features 306 and based at least in part on the one or more musical embeddings 404.

In some implementations, the audio generation model 304 can be a conditional generative model able to generate a melody conditioned on the sequence of predicted features (e.g., musical embeddings and/or structural features).

In some implementations, the audio generation model 304 includes an autoregressive model (e.g., a long short-term memory model) that is trained to construct the piece one note at a time based on previous context. The context at time t can include the notes generated thus far, combined with the musical embeddings and/or structural features. In some implementations, the audio generation model 304 can be provided with additional data such as, for example, the musical compositions accompanying the lyrics and music features described above as training data for the deep neural network.

Once trained, model 304 can be used to generate new compositions conditionally. For example, the notes generated at time t by the model 304 can be fed back in as inputs. In some implementations, the performance of model 304 can be improved by using adversarial training, where the model 304 is rewarded when it successfully fools a classifier into thinking that it has generated music similar to those pieces found in the training set.

The resulting compositions can be rendered as audio using standard music production software. Alternately, an additional generative model could be used to generate audio conditioned on these compositions.

As one example structure for the audio generation model 304, FIG. 8 depicts a diagram of an example structure of an example audio generation model 800 according to example embodiments of the present disclosure.

Referring again to FIG. 4, more or fewer features than those described above can be used. Alternative features can be used as well. For example, each subset of features in the merged sequence of features could further include a mood feature, a subject matter feature, or other structural features. The audio generation model 304 can generate the musical composition from whichever features are provided.

Example Methods

Figure 5:
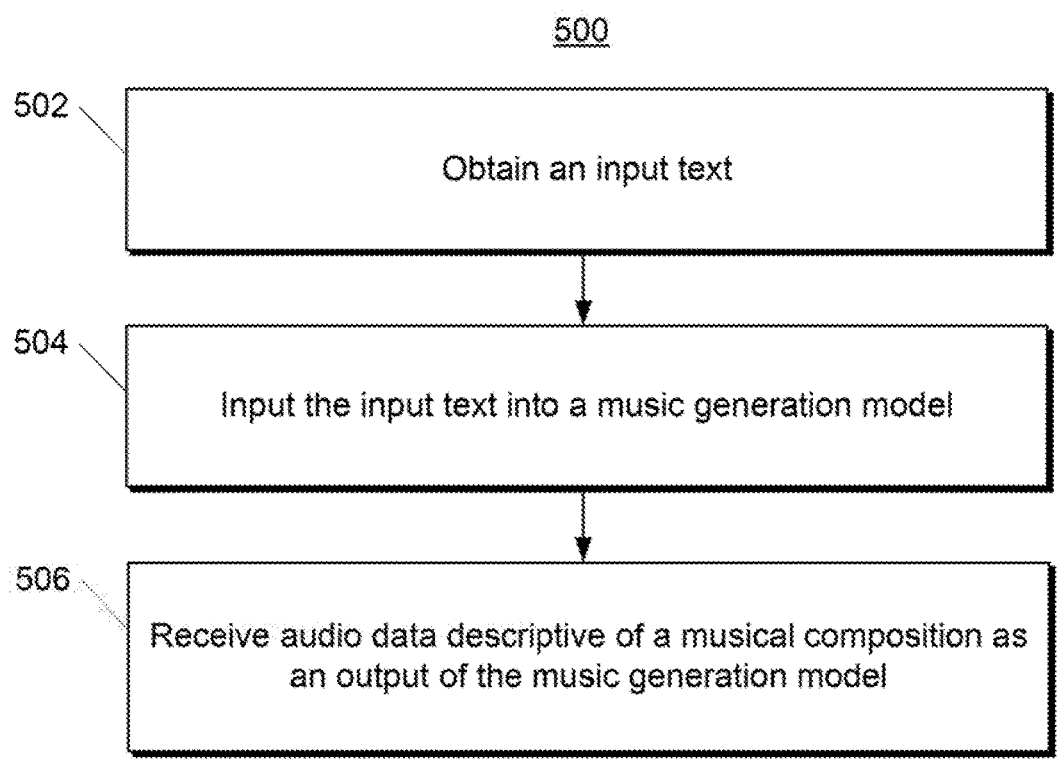
FIG. 5 depicts a flow chart diagram of an example method to generate music from text according to example embodiments of the present disclosure.

FIG. 5 depicts a flow chart diagram of an example method to perform music generation according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system obtains an input text. As an example, the server computing system 130 can perform method 500. For example, at 502, the server computing system 130 can receive or otherwise obtain the input text from the user computing device 102. As another example, the user computing device 102 can instruct and/or provide consent from the user for the server computing system 130 to obtain the input text from another server computing system over network 180. In yet another example, the user computing device 102 can perform method 500 in a solitary fashion (e.g., "by itself"). Thus, at 502, the user computing device 102 can obtain the input text.

In one example, the input text can be a poem. As another example, the input text can be a textual conversation extracted or otherwise obtained from a text messaging application, a group chat application, an electronic mail application, or other messaging application. Similarly, the input text can include one or more social media postings. As further examples, input texts can be extracted or otherwise obtained from a news article, a webpage, a novel, a screenplay, a document, a dictated text from spoken words (e.g., a text obtained by inputting a video or other audio source through a speech-to-text translator), or any other form of text.

At 504, the computing system inputs the input text into a music generation model. The music generation model can extract one or more structural features from the input text. The one or more structural features can be indicative of a structure associated with the input text. The music generation model can generate a musical composition that exhibits a musical structure that mimics or otherwise corresponds to the input text (e.g., to a structure of the input text).

At 506, the computing system receives audio data descriptive of the musical composition as an output of the music generation model. In such fashion, the systems and methods of the present disclosure can generate music that exhibits a globally consistent theme and/or structure.

Figure 6:
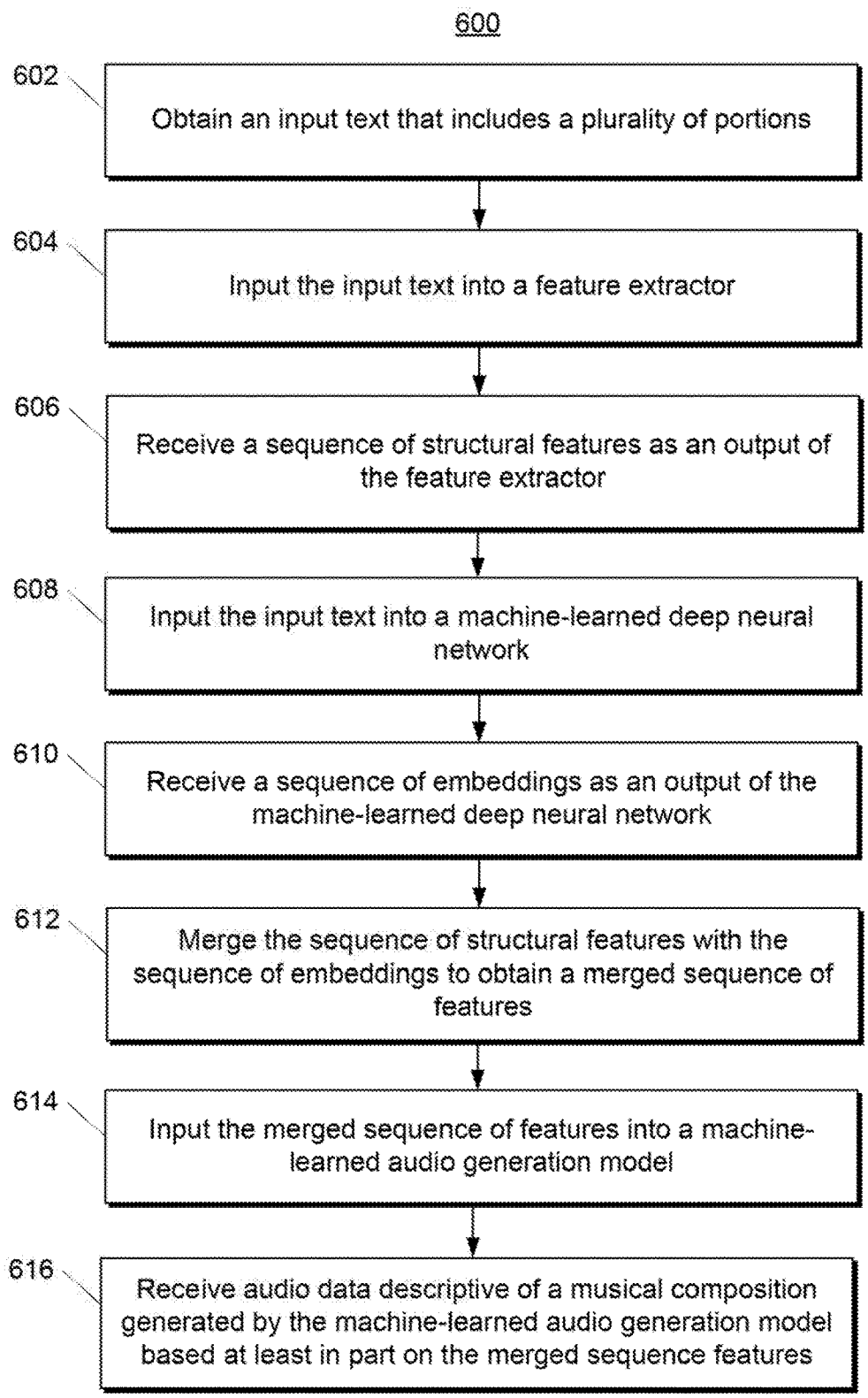
FIG. 6 depicts a flow chart diagram of an example method to generate music from text according to example embodiments of the present disclosure.

FIG. 6 depicts a flow chart diagram of an example method to perform music generation according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system obtains an input text that includes a plurality of portions. As an example, a poem can have a plurality of lines. For example, the lines of a poem can be separated by line breaks. As another example, a textual conversation can include a plurality of textual messages, where each message has a sender associated therewith. As further examples, a segmentation component can be used to segment an input text into a plurality of portions based on line breaks, page breaks, paragraph breaks, chapter breaks, speaker identity (e.g., in the case of a screenplay or novel with conversation), or other parameters.

At 604, the computing system inputs the input text into a feature extractor. In particular, a music generation model can include a feature extractor that extracts the one or more structural features. Example structural features include rhyme features, mood features, subject matter features, or other structural features.

At 606, the computing system receives a sequence of structural features as an output of the feature extractor. In particular, the feature extractor can extract one or more structural features from each of the plurality of portions. For example, the one or more structural features extracted from each of the plurality of portions can be concatenated according to an order associated with the plurality of portions to form the sequence of structural features.

At 608, the computing system inputs the input text into a machine-learned deep neural network. For example, the deep neural network can have been trained on or using a training dataset that includes a plurality of sets of lyrics from humanly-generated songs, wherein each set of lyrics is annotated with one or more music features descriptive of the backing music associated with such set of lyrics in the corresponding humanly-generated song. Example music features include a tempo feature, a loudness feature, a dynamic feature, a pitch histogram feature, a dominant melodic interval feature, a direction of motion feature, and a dominant harmony feature.

At 610, the computing system receives a sequence of embeddings as an output of the machine-learned deep neural network. As an example, the deep neural network can respectively receive each portion of the input text and, in response, respectively provide at least one musical embedding for each portion of the input text. Thus, the deep neural network can provide a sequence of musical embeddings, where each of the musical embeddings corresponds to one of the portions of the input text.

At 612, the computing system merges the sequence of structural features with the sequence of embeddings to obtain a merged sequence of features. For example, the sequence of structural features can be merged with the sequence of embeddings in an interleaving fashion, to form one group of features for each portion of the input text.

At 614, the computing system inputs the merged sequence of features into a machine-learned audio generation model. At 616, the computing system receives audio data descriptive of a musical composition generated by the machine-learned audio generation model based at least in part on the merged sequence of features.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer system to generate music from text, the system comprising:
 a feature extractor configured to extract one or more structural features from an input text that comprises a plurality of portions, wherein the one or more structural features are indicative of a structure associated with the input text, and wherein the feature extractor is configured to extract at least one structural feature for each of the plurality of portions to generate a sequence of structural features from the input text;
 a machine-learned deep neural network that is configured to receive each of the plurality of portions of the text and, in response, output a plurality of musical embeddings respectively for the plurality of portions, wherein the machine-learned deep neural network was trained on a training dataset that comprises a plurality of sets of lyrics from humanly-generated songs, wherein each set of lyrics is annotated with one or more music features descriptive of backing music associated with such set of lyrics in the corresponding humanly-generated song; and
 a machine-learned audio generation model configured to:
  obtain the sequence of structural features from the feature extractor;
  obtain the plurality of musical embeddings from the machine-learned deep neural network; and
  generate a musical composition from the input text based at least in part on the sequence of structural features and further based at least in part on the plurality of musical embeddings;
 one or more processors; and
 one or more non-transitory computer-readable media that collectively store instructions that, when executed by the one or more processors cause the computer system to:
  obtain the input text;
  input the input text into the feature extractor;
  receive the sequence of structural features as an output of the feature extractor;
  input the input text into the machine-learned deep neural network;
  receive the plurality of musical embeddings as an output of the machine-learned deep neural network;
  input the sequence of structural features and the plurality of musical embeddings into the machine-learned audio generation model; and
  receive data descriptive of the musical composition as an output of the machine-learned audio generation model.

2. The computer system of claim 1, wherein the machine-learned deep neural network comprises a character-based long short-term memory layer.

3. The computer system of claim 1, wherein the one or more music features annotated to each set of lyrics comprises one or more of the following: a tempo feature, a loudness feature, a dynamic feature, a pitch histogram feature, a dominant melodic interval feature, a direction of motion feature, and a dominant harmony feature.

4. The computer system of claim 1, wherein:
 the input text comprises a poem;
 the plurality of portions of the poem comprise a plurality of lines; and
 the feature extractor is configured to determine a rhyme scheme for the poem, the rhyme scheme descriptive of a pattern of rhymes exhibited by the plurality of lines of the poem, the pattern of rhymes forming the sequence of structural features.

5. The computer system of claim 1, wherein the feature extractor is configured to extract one or more of:
 a mood feature for each of the plurality of portions, the mood feature for each portion descriptive of a mood associated with such portion; and
 a subject matter feature for each of the plurality of portions, the subject matter feature for each portion descriptive of a subject associated with such portion.

6. The computer-system of claim 1, wherein the machine-learned audio generation model comprises a machine-learned generative adversarial network.

7. The computer system of claim 1, wherein the machine-learned deep neural network comprises a genre-specific network that has been trained on a training dataset that comprises humanly-generated songs of only a specific genre selected by a user.

8. The computer system of claim 1, wherein the machine-learned deep neural network comprises a personalized network that has been trained on a training dataset that comprises user-selected songs that have been selected by a user.

9. A computer-implemented method to generate music from text, the method comprising:
 obtaining, by one or more computing devices, an input text that comprises a plurality of portions;
 inputting, by the one or more computing devices, the input text into a feature extractor that is configured to extract at least one structural feature from each of the plurality portions of the input text;
 receiving, by the one or more computing devices, a sequence of structural features as an output of the feature extractor, the sequence of structural features comprising the at least one structural feature extracted from each of the plurality portions of the input text;
 inputting, by the one or more computing devices, the input text into a machine-learned deep neural network that was trained on a training dataset that comprises a plurality of sets of lyrics from humanly-generated songs, each set of lyrics annotated with one or more music features descriptive of backing music associated with such set of lyrics in the corresponding humanly-generated song;
 receiving, by the one or more computing devices, a sequence of musical embeddings as an output of the machine-learned deep neural network, the sequence of musical embeddings comprising a plurality of musical embeddings respectively provided by the machine-learned deep neural network for the plurality of portions of the input text; and
 merging, by the one or more computing devices, the sequence of structural features with the sequence of musical embeddings in an interleaving fashion to form a merged sequence of features;
 inputting, by the one or more computing devices, the merged sequence of features into a machine-learned audio generation model; and
 receiving, by the one or more computing devices, data descriptive of a musical composition generated by the machine-learned audio generation model based at least in part on the merged sequence of features.

10. The computer-implemented method of claim 9, wherein receiving, by the one or more computing devices, a sequence of structural features as an output of the feature extractor comprises receiving, by the one or more computing devices, a sequence of mood features as an output of the feature extractor, each mood feature in the sequence of mood features descriptive of a mood associated with a respective one of the plurality of portions of the input text.

11. The computer-implemented method of claim 9, wherein receiving, by the one or more computing devices, a sequence of structural features as an output of the feature extractor comprises receiving, by the one or more computing devices, a sequence of subject matter features as an output of the feature extractor, each subject matter feature in the sequence of subject matter features descriptive of a subject associated with a respective one of the plurality of portions of the input text.

12. The computer-implemented method of claim 9, wherein receiving, by the one or more computing devices, a sequence of structural features as an output of the feature extractor comprises receiving, by the one or more computing devices, a rhyme scheme as an output of the feature extractor, the rhyme scheme indicative of a respective rhyme associated with each portion of the input text.

13. The computer-implemented method of claim 9, wherein obtaining, by the one or more computing devices, the input text that comprises the plurality of portions comprises obtaining, by the one or more computing devices, a textual conversation from a messaging application, the textual conversation including a plurality of messages that correspond to the plurality of portions.

14. The computer-implemented method of claim 9, wherein obtaining, by the one or more computing device, the input text that comprises the plurality of portions comprises obtaining, by the one or more computing devices, a social media text, the social media text including a plurality of social media postings that correspond to the plurality of portions.

15. One or more tangible, non-transitory computer-readable media that store instructions that, when executed by one or more processors, cause a computing system to:
obtain an input text that comprises a plurality of portions;
provide the input text to a machine-learned deep neural network that was trained on a training dataset that comprises a plurality of sets of lyrics from humanly-generated songs, each set of lyrics annotated with one or more music features descriptive of backing music associated with such set of lyrics in the corresponding humanly-generated song;
receive a sequence of musical embeddings as an output of the machine-learned deep neural network, the sequence of musical embeddings comprising a plurality of musical embeddings respectively provided by the machine-learned deep neural network for the plurality of portions of the input text; and
input the sequence of musical embeddings into a machine-learned audio generation model; and
receive data descriptive of a musical composition as an output of the machine-learned audio generation model.

16. The one or more tangible, non-transitory computer-readable media of claim 15, wherein the input text comprises a poem that includes a plurality of lines, the plurality of lines corresponding to the plurality of portions, wherein the instructions cause the computing system to generate a sequence of features for the poem, wherein the sequence of features comprises a plurality of feature groups that respectively correspond to the plurality of lines, and wherein the feature group for each line includes a rhyme feature that describes a contribution of such line to a rhyme scheme, and wherein the instructions cause the computing system input the sequence of features into the machine-learned audio generation model alongside the sequence of musical embeddings.

17. The one or more tangible, non-transitory computer-readable media of claim 15, wherein the machine-learned audio generation model comprises a machine-learned generative adversarial network.

\* \* \* \* \*